May 6, 1958 E. J. PURTZER 2,833,205
PORTABLE BARBECUE
Filed Sept. 14, 1955 2 Sheets-Sheet 1
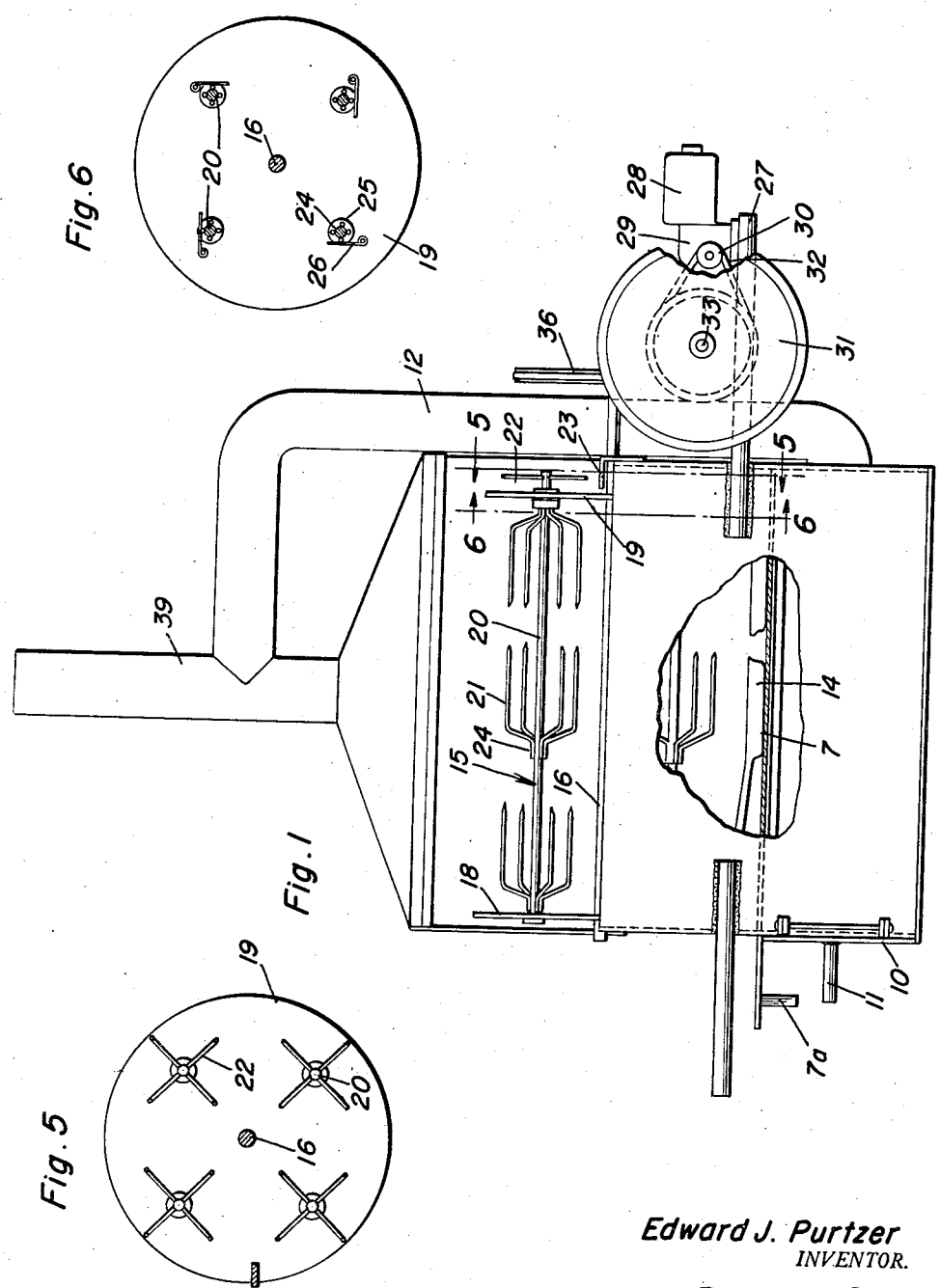
Edward J. Purtzer
INVENTOR.
BY *Clarence A. O'Brien*
*and Harvey B. Jacobson*
Attorneys May 6, 1958
E. J. PURTZER
2,833,205
PORTABLE BARBECUE
Filed Sept. 14, 1955
2 Sheets-Sheet 2
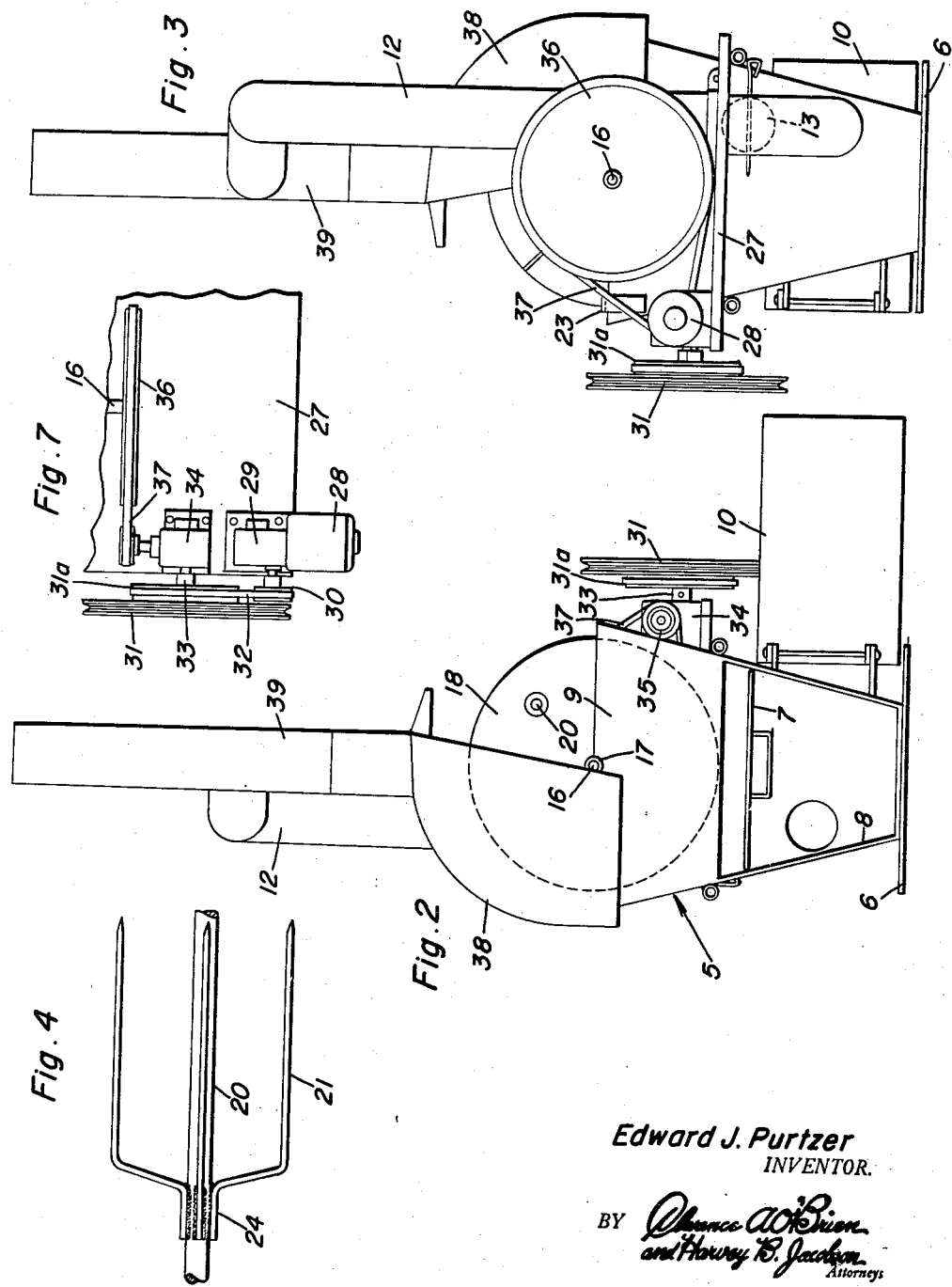
Edward J. Purtzer
INVENTOR.

2,833,205
PORTABLE BARBECUE
Edward J. Purtzer, Tell City, Ind.

Application September 14, 1955, Serial No. 534,186

1 Claim. (Cl. 99—421)

The present invention relates to new and useful improvements in portable barbecues for cooking food out-of-doors or indoors.

An important object of the invention is to provide a cooker of this character which is constructed with a fire box adapted for burning either wood or charcoal, or both, and above which is mounted a rotatable meat supporting spit.

Another object is to provide a rotatable spit in the form of a drum including a power operated main shaft to which a pair of discs are fixed and which support a plurality of auxiliary independently rotatable shafts on which meat supporting skewers are secured, said auxiliary shafts being intermittently turned by the rotation of the drum to turn the meat each time it approaches the fire.

A further object is to install a baffle plate between the fire and the drum to deflect flame from the meat but which permits smoke to contact the meat and to provide the baffle with trays for holding charcoal for cooking the meat.

An additional object is to provide an adjustable hood for the spit as an aid in controlling the heat.

A still further object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front elevational view;

Figure 2 is an end elevational view;

Figure 3 is an opposite end elevational view;

Figure 4 is an enlarged side elevational of one of the skewers;

Figure 5 is a fragmentary vertical sectional view on a reduced scale taken on a line 5—5 of Figure 1;

Figure 6 is a fragmentary vertical sectional view on a reduced scale taken on a line 6—6 of Figure 1; and Figure 7 is a fragmentary top plan view of the drive means for the spit.

Referring now to the drawings in detail, wherein for the purpose of illustration I have disclosed a preferred embodiment of my invention, the numeral 5 designates a sheet metal or other suitably constructed casing having upwardly flared walls and supported on a base plate 6 and which may be provided with legs (not shown). A baffle plate 7 is slidably supported in the casing to separate the latter into a lower firebox 8 and an upper spit chamber 9, the latter being open at its top.

One end of the firebox is closed by a hinged door 10 having a handle 11 and a flue 12 extends upwardly at the other end of the firebox and is provided with a damper 13. The firebox is designed for burning wood placed therein and trays 14 are placed on top of the baffle plate 7 for burning charcoal therein. A handle 7a is also provided at the outer end of the baffle plate.

A drum-type spit is designated generally at 15 and includes a main shaft 16 which has its end portions rotatably supported in bearing notches 17 in the upper edge portions of the end walls of the spit chamber 9 and a pair of disks 18 and 19 are suitably secured to the main shaft inside the spit chamber and adjacent the opposite ends of the main shaft. A plurality of eccentric shafts 20 are rotatably supported by the disks and on which meat holding skewers 21 are suitably secured parallel to the shafts. Spiders or star wheels 22 of cruciform shape are secured to one end of the eccentric shafts for engaging a lug 23 which is secured in a stationary position to an adjacent end wall of the spit chamber for turning the eccentric shafts and skewers intermittently a quarter turn as the spit is rotated.

The skewers are arranged in groups which include end portions 24 which are welded in longitudinal position to the shafts 20 and the end portions 24 of one group of skewers are suitably secured to a collar 25 which is attached to the inner surface of disk 19. The end portions of said group of skewers are tensionally engaged by the free end of a leaf spring 26 carried by the adjacent disk of the spit to oppose idle turning movement of the eccentric shafts.

A platform 27 is secured to one end of the casing 5 and on which an electric motor 28 is mounted. The motor is of a conventional type and provided with a gear housing 29 for driving a pulley 30 at one side of the housing and double speed reduction pulleys 31 and 31a of different diameters are driven by a belt 32 from pulley 30. Pulleys 31 and 31a are reversibly secured to a shaft 33 which enters a reduction gear housing 34 of a conventional type and which includes a pulley 35 on the outside of the housing 34 for driving a pulley 36 on one end of the main shaft 16 by a belt 37. The reversing of pulleys 31 and 31a changes the driving speed of shaft 33.

A hood 38 is mounted on the upper portion of the casing 5 at the rear of the spit to expose the front portion thereof above the spit and a flue 39 extends upwardly from the hood and to which the upper end of flue 12 is also attached.

Handles 40 are attached at the sides of the casing for convenience in carrying the device.

What is claimed as new is as follows:

A portable cooking apparatus comprising a casing having sides and ends and an open top, a horizontal baffle plate in the lower part of the casing fitting between the sides and ends thereof and dividing the casing into a lower firebox and an upper spit chamber and slidably fitted in said casing to close said firebox and chamber from each other or to variably open the same to each other, a spit rotatably mounted in the upper portion of the spit chamber and extending partway above the casing and including a central rotary shaft, and a plurality of independently rotatable shafts eccentric to the central shaft and provided with skewers, a hood on said casing partly closing the top thereof and extending partway over said spit for partly covering the spit while exposing a front portion thereof, and means for rotating the independently rotatable shafts intermittently a quarter-turn in response to rotation of said central shaft comprising a lug on said casing and cruciform members on said independently rotatable shafts wipingly engaging said lug.

References Cited in the file of this patent
UNITED STATES PATENTS

| | | |
|---|---|---|
| 1,731,743 | Harrison | Oct. 15, 1929 |
| 1,964,372 | Tygart | June 26, 1934 |
| 2,520,067 | Sagen | Aug. 22, 1950 |
| 2,696,163 | Galley | Dec. 7, 1954 |
| 2,722,882 | Wilson | Nov. 8, 1955 |
| 2,763,200 | Kittler | Sept. 18, 1956 |